(No Model.)
G. E. FELCH.
KNIFE HOLDER AND PACKAGE.
No. 291,704. Patented Jan. 8, 1884.
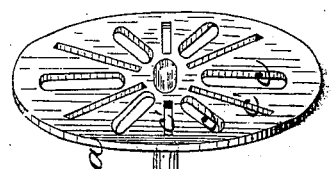
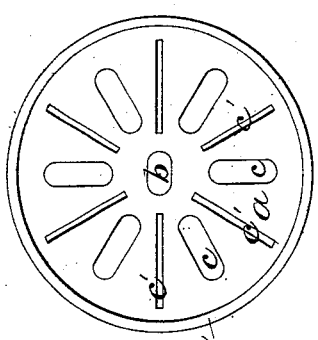
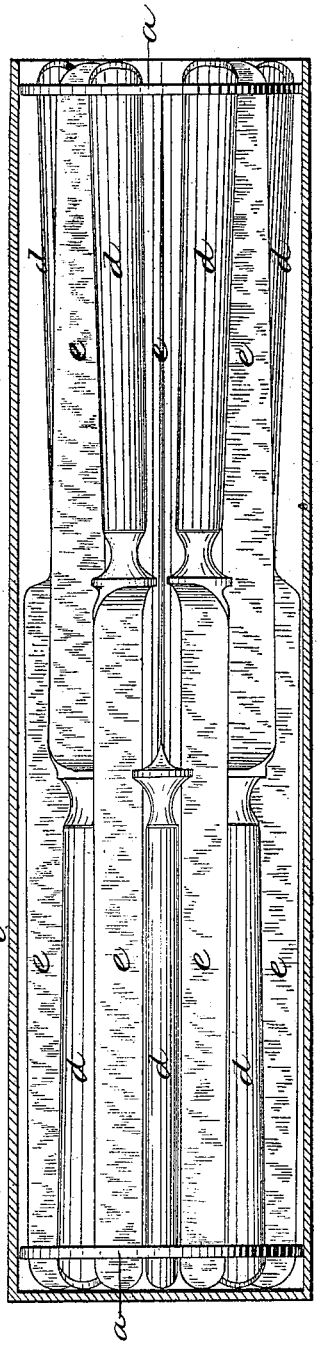
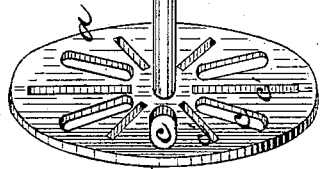
Witnesses:
Chas. S. Gording.
A. C. Will.
Inventor:
Geo. E. Felch
by Wright & Brown
Attys.

UNITED STATES PATENT OFFICE.

GEORGE E. FELCH, OF AYER, MASSACHUSETTS.

KNIFE HOLDER AND PACKAGE.

SPECIFICATION forming part of Letters Patent No. 291,704, dated January 8, 1884.

Application filed November 12, 1883. (No model.)

*To all whom it may concern:*

Be it known that I, GEORGE E. FELCH, of Ayer, in the county of Middlesex and State of Massachusetts, have invented certain Improvements in Knife Holders and Packages, of which the following is a specification.

This invention consists in the improved means, hereinafter described, for packing table-knives in dozens or other suitable quantities for sale, the object of the invention being to enable the goods to be put upon the market in a form which will be attractive and convenient.

Of the accompanying drawings, forming a part of this specification, Figure 1 represents a side view of my improved knife-holder containing a group of knives. Fig. 2 represents a perspective view of the holder without the knives. Fig. 3 represents an end view of the holder.

The same letters of reference indicate the same parts in all the figures.

My improved holder is composed of two plates or disks, $a\ a$, of pasteboard, leather-board, or any other suitable material, connected by a rod or bar, $b$, and provided with radial slots or sockets $c\ c'$. Each slot $c$ is adapted to receive the handle $d$ of a table-knife, and each slot $c'$ is adapted to receive the blade $e$ of a similar knife. The distance between the disks $a\ a$ is such that a knife can rest at one end in a socket in one disk and at its opposite end in a socket in the other disk, as shown in Fig. 1. The radial arrangement of the sockets enables the knives to be held in a circular series, occupying comparatively small space, and adapted to be placed in a cylindrical box, $i$. The slots $c\ c'$ alternate in each disk, and the slots $c$ in one disk coincide with or correspond in position to the slots $c'$ in the other disk, so that the handles and blades of the knives alternate when placed in said slots.

It will be observed that by this device knives can be readily arranged in circular order and held in said order within a tubular box, the whole constituting a neat and attractive package, which is also compact and more convenient in form than the ordinary rectangular box in which knives are generally placed for sale.

I prefer to have the outer ends of the slots closed, as shown in the drawings, the knives being slipped into the slots by endwise movements; but it is obvious that said slots may be open at their outer ends, if preferred.

The plates $a\ a$ may be polygonal in form, instead of circular, if desired.

The rod or bar $b$ may be of wood, metal, or any other suitable material.

I claim—

1. The improved knife-holder composed of the radially-slotted plates united by a bar, as set forth.

2. The improved knife-holder composed of the plates $a$, connected by the bar $b$, and provided with alternating radial slots $c\ c'$, the slots $c$ of the one plate corresponding with the slots $c'$ of the other, as set forth.

3. In a knife-holder, the combination of the radially-slotted plates or disks $a\ a$, the connecting bar or rod $b$, and the cylindrical inclosing-box, as set forth.

In testimony whereof I have signed my name to this specification, in the presence of two subscribing witnesses, this 8th day of November, 1883.

GEO. E. FELCH.

Witnesses:
GILBERT E. FELCH,
C. F. BROWN.